(12) United States Patent
Fujisawa

(10) Patent No.: US 10,276,046 B2
(45) Date of Patent: Apr. 30, 2019

(54) ROADSIDE UNIT AND ACCIDENT MONITORING SYSTEM INCLUDING SAME

(71) Applicant: Panasonic Intellectual Property Management Co., Ltd., Osaka (JP)

(72) Inventor: Toru Fujisawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/919,851

(22) Filed: Mar. 13, 2018

(65) Prior Publication Data

US 2018/0286235 A1 Oct. 4, 2018

(30) Foreign Application Priority Data

Mar. 31, 2017 (JP) .................. 2017-069628

(51) Int. Cl.
| | |
|---|---|
| *G08G 1/09* | (2006.01) |
| *G08G 1/0967* | (2006.01) |
| *H04W 4/44* | (2018.01) |
| *G06K 9/00* | (2006.01) |
| *G08B 25/00* | (2006.01) |
| *G08G 1/01* | (2006.01) |
| *G08G 1/04* | (2006.01) |
| *H04W 84/00* | (2009.01) |

(52) U.S. Cl.
CPC ... *G08G 1/096783* (2013.01); *G06K 9/00771* (2013.01); *G08B 25/00* (2013.01); *G08G 1/0116* (2013.01); *G08G 1/0133* (2013.01); *G08G 1/04* (2013.01); *H04W 4/44* (2018.02); *H04W 84/00* (2013.01)

(58) Field of Classification Search
CPC .. G08G 1/096783; G08G 1/04; G08G 1/0133; G08G 1/0116; G08B 25/00; H04W 84/00; H04W 4/44; G06K 9/00771
USPC ..... 340/905, 937, 936, 933, 995.1; 701/301, 701/1, 23, 20; 348/148
See application file for complete search history.

(56) References Cited

U.S. PATENT DOCUMENTS

2013/0204515 A1* 8/2013 Emura ................. G08G 1/0112
701/119
2013/0311641 A1* 11/2013 Chow ....................... G08G 1/04
709/224

(Continued)

FOREIGN PATENT DOCUMENTS

JP  2009-258878  11/2009

*Primary Examiner* — Anh V La
(74) *Attorney, Agent, or Firm* — Greenblum & Bernstein, P.L.C.

(57) ABSTRACT

A roadside unit includes a first communicator that performs road-to-vehicle communication with an on-board device incorporated in a first vehicle, a second communicator that communicates with an accident monitoring server, an acquirer that acquires first image information from an imaging device that takes images of object on a road, and a detector that detects an occurrence of an accident caused by a second vehicle based on the first image information acquired by the acquirer. The acquirer acquires vehicle information from the first vehicle via the first communicator when the detector detects the occurrence of the accident. The second communicator transmits, to the accident monitoring server, the first image information and the vehicle information both acquired by the acquirer.

7 Claims, 4 Drawing Sheets

(56) References Cited

U.S. PATENT DOCUMENTS

2016/0247538 A1* 8/2016 Chuang .................. G11B 27/10
2018/0068562 A1* 3/2018 Ho .......................... G01S 13/91

* cited by examiner

ROADSIDE UNIT AND ACCIDENT MONITORING SYSTEM INCLUDING SAME

BACKGROUND

1. Technical Field

The present disclosure relates to an accident monitoring system and a roadside unit (RSU) included in the system.

2. Description of the Related Art

Accident monitoring systems for monitoring accident situations at, for example, road intersections have been known. For example, according to an accident monitoring system disclosed in Japanese Patent Unexamined Publication No. 2009-258878, an accident occurrence notification is transmitted by an on-board device incorporated in a vehicle involved in an accident (hereinafter referred as an accident vehicle), and the accident occurrence notification is received by an on-road communication unit that exists around the accident vehicle. The on-road communication unit transmits, to an accident monitoring server, vehicle interior images acquired from the on-board device of the accident vehicle and on-road images taken by the on-road communication unit. This system enables the police, fire departments, road administrators, etc. to grasp the accident situation in more detail.

SUMMARY

The present disclosure provides a roadside unit (RSU) used for an accident monitoring system capable of reliably detecting an occurrence of an accident and monitoring the situation of the accident in detail.

An RSU according to the present disclosure includes a first communicator, a second communicator, an acquirer, and a detector. The first communicator performs road-to-vehicle communication with an on-board device incorporated in a first vehicle. The second communicator communicates with an accident monitoring server. The acquirer acquires first image information from an imaging device that takes images of objects on a road. The detector detects an occurrence of an accident caused by a second vehicle based on the first image information acquired by the acquirer. Furthermore, the acquirer acquires vehicle information from the first vehicle via the first communicator when the detector detects the occurrence of the accident. The second communicator transmits, to the accident monitoring server, the first image information and the vehicle information that are acquired by the acquirer.

The present disclosure makes it possible to reliably detect an occurrence of an accident and monitor the situation of the accident in detail.

DETAILED DESCRIPTION OF PREFERRED EMBODIMENTS

Problems with conventional technology will be described briefly prior to describing the exemplary embodiment of the present disclosure. The accident monitoring system disclosed in Japanese Patent Unexamined Publication No. 2009-258878 requires that the accident vehicle needs to incorporate the on-board device. This means that, if a vehicle that does not incorporate the on-board device has caused an accident, the system is unable to recognize the occurrence of the accident and is unable to monitor the situation of the accident.

Hereafter, the exemplary embodiment of the present disclosure will be described with reference to the drawings. The present exemplary embodiment describes an accident monitoring system including a roadside unit (RSU).

Figure 1:
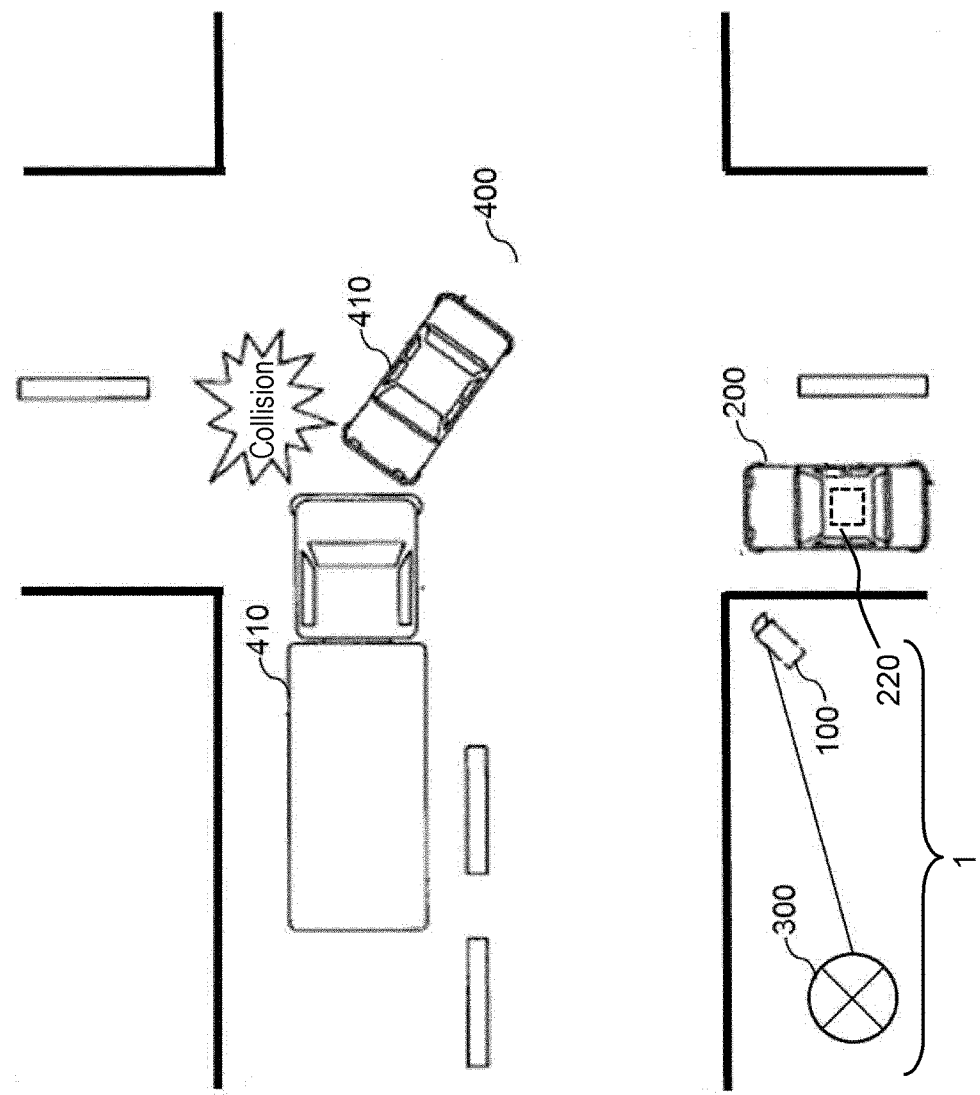
FIG. 1 is a view for illustrating a configuration of an accident monitoring system including an RSU according to an exemplary embodiment of the present disclosure.

FIG. 1 is a view for illustrating the configuration of accident monitoring system 1 according to the present exemplary embodiment. Accident monitoring system 1 includes RSU 100, on-board device 220, and accident monitoring server 300.

RSU 100 is connected to accident monitoring server 300 via, for example, a network, and is installed at a predetermined position of road intersection 400, like a traffic light. On-board device 220 is incorporated in first vehicle (hereinafter simply "vehicle") 200, and performs road-to-vehicle communication with RSU 100. In FIG. 1, vehicle 200 is traveling in the vicinity of road intersection 400. Accident monitoring server 300 collects and retains accident information that is output from RSU 100. Note that vehicle 200 is not involved in an accident, but just exists within a communication range from RSU 100 at the time of the occurrence of the accident and is irrelevant to the accident.

In accident monitoring system 1, RSU 100 monitors occurrences of traffic accidents in an area including road intersection 400. When an accident occurs, RSU 100 collects accident information including vehicle information from vehicle 200 along with monitoring information, and transmits the accident information to accident monitoring server 300. Accident monitoring server 300 retains these pieces of information.

Configuration of RSU 100

Figure 2:
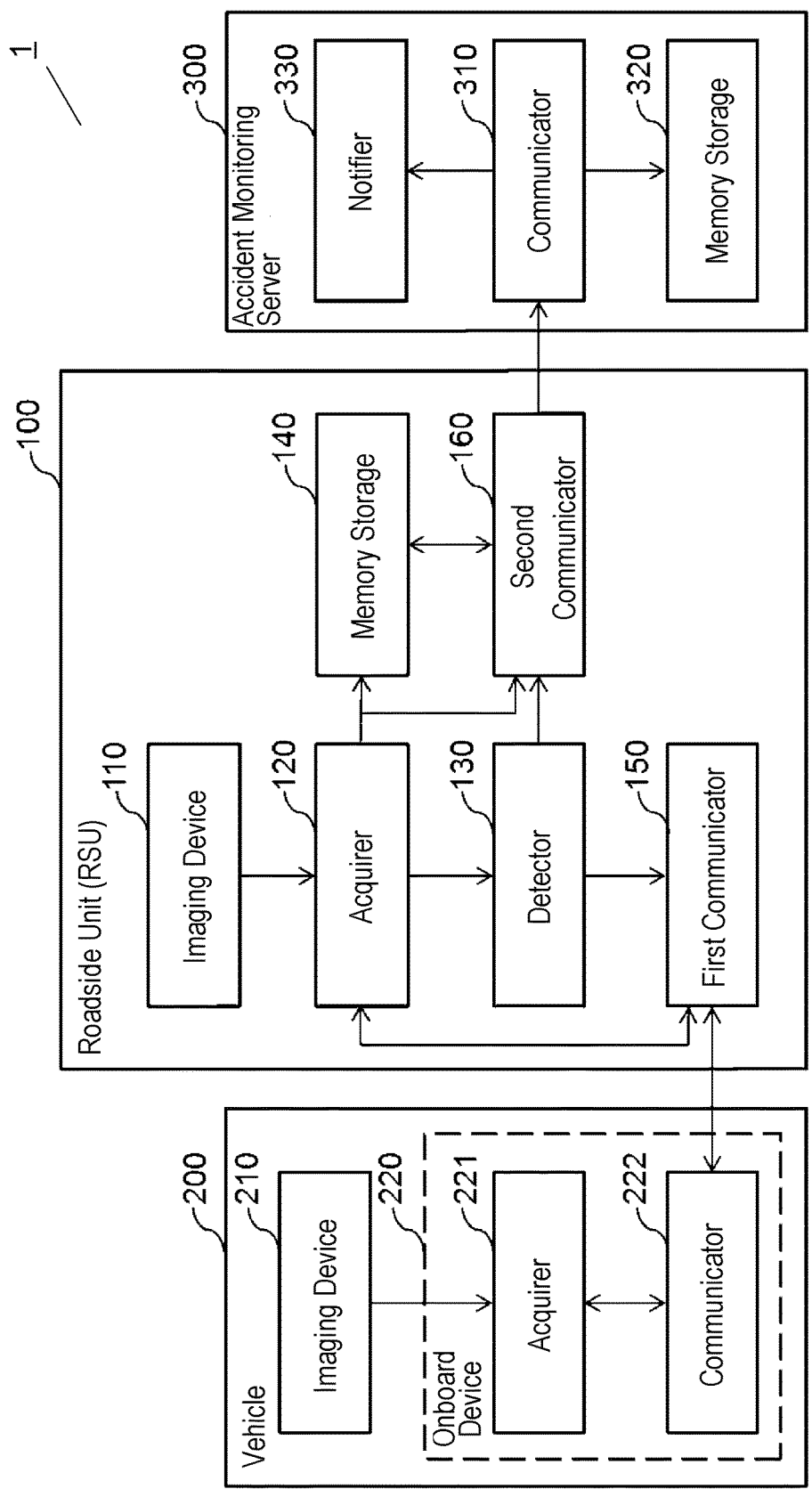
FIG. 2 is a functional block diagram illustrating the accident monitoring system including the RSU according to the exemplary embodiment of the present disclosure.

FIG. 2 is a functional block diagram of accident monitoring system 1.

RSU 100 communicates with on-board device 220 as well as accident monitoring server 300. RSU 100 includes imaging device 110, acquirer 120, detector 130, memory storage 140, first communicator 150, and second communicator 160.

Imaging device 110 is a camera that is capable of taking images of objects on the road. Imaging device 110 takes images of a predetermined area including road intersection 400, and acquires, as the first image information, an image containing an image of a vehicle (for example, vehicle 410 in FIG. 1) traveling through road intersection 400 in association with the time at which the image is taken. Imaging device 110 outputs the acquired first image information to acquirer 120. The images to be taken may be either still images or moving images. It is also possible that imaging device 110 may be provided separately from RSU 100 and may output the acquired first image information to acquirer 120 of RSU 100.

Acquirer 120 acquires first image information from imaging device 110. Acquirer 120 outputs the acquired first image information to detector 130 and memory storage 140. In addition, when detector 130 detects an occurrence of an accident, acquirer 120 acquires the vehicle information that is output from first communicator 150 and outputs the acquired vehicle information to second communicator 160. The details of the vehicle information will be described later.

Detector 130 detects an occurrence of an accident based on the first image information that is output from acquirer 120. Detector 130 performs image recognition on the image as the first image information and detects the occurrence of the accident from the image. Any known method is applicable to the detection of the occurrence of the accident by means of image recognition. In addition, detector 130 identifies the time corresponding to the image in which the occurrence of the accident has been detected, as an accident occurrence time. When detector 130 detects the occurrence of the accident, detector 130 outputs accident detection information to first communicator 150 and second communicator 160. This accident detection information includes information of the accident occurrence time.

Memory storage 140 retains the first image information that is output from acquirer 120. In addition, when detector 130 detects the occurrence of the accident, memory storage 140 retains the vehicle information about vehicle 200, which is output from acquirer 120. Note that memory storage 140 also retains traffic light information on a traffic light installed at road intersection 400. The traffic light information includes light color information of the traffic light when a vehicle is entering road intersection 400 from a predetermined direction, and light color cycle information, for example. Memory storage 140 may be configured to include a semiconductor memory element such as a flash memory, and a recording medium such as a hard disk and an optical disc. In addition, memory storage 140 outputs the first image information and the vehicle information that are retained therein, to second communicator 160, in response to a request from second communicator 160.

Upon acquiring the accident detection information from detector 130, first communicator 150 broadcast-transmits a request signal to on-board device 220 incorporated in vehicle 200, based on the accident detection information. The request signal is a signal for requesting on-board device 220 to transmit the vehicle information held by vehicle 200 to first communicator 150. The vehicle information includes, for example, the positional information, the traveling direction, and the traveling speed of vehicle 200, and the second image information containing an image taken by imaging device 210 incorporated in vehicle 200. On-board device 220 transmits the vehicle information held by vehicle 200 to first communicator 150, based on the received request signal. First communicator 150 receives the vehicle information transmitted from on-board device 220 and outputs the vehicle information to acquirer 120.

First communicator 150 of RSU 100 wirelessly communicates with on-board device 220. For example, the wireless communication is made using the 700 MHz band or the 5.8 GHz band, which is used for road-to-vehicle communication. The communication between first communicator 150 and on-board device 220 is not limited thereto, and the wireless communication may be made in accordance with a wireless LAN standard such as IEEE 802.11.

Upon acquiring the accident detection information from detector 130, second communicator 160 acquires the first image information during a predetermined period of time (hereinafter referred to as "predetermined-period image information") among the first image information recorded in memory storage 140, counted based on the accident occurrence time contained in the accident detection information. As an example, the predetermined-period image information may be the first image information for a constant period of time (for example, 10 seconds, 30 seconds, or 60 seconds) after the accident occurrence time. Alternatively, the predetermined-period image information may be the first image information during a period having an equal time length (for example, 10 seconds, 30 seconds, or 60 seconds) before and after the accident occurrence time. In addition, second communicator 160 acquires the vehicle information that is retained in memory storage 140, based on the accident occurrence time. Second communicator 160 transmits the acquired predetermined-period image information and the acquired vehicle information to accident monitoring server 300. Note that second communicator 160 and accident monitoring server 300 may communicate with each other via a network such as the Internet. The communication between second communicator 160 and accident monitoring server 300 may use either wired communication or wireless communication.

Configuration of On-Board Device 220

As illustrated in FIG. 2, on-board device 220 is incorporated in vehicle 200, and includes acquirer 221 and communicator 222.

Acquirer 221 acquires vehicle information about vehicle 200 that incorporates on-board device 220. As described previously, the vehicle information includes the positional information, the traveling direction, and the traveling speed of vehicle 200, and the second image information containing an image taken by imaging device 210 incorporated in vehicle 200. Acquirer 221 acquires an image containing an image of second vehicle (hereinafter "accident vehicle") 410 taken by imaging device 210 as the second image information. Note that the image to be acquired may be either a still image or a moving image. In addition, acquirer 221 acquires the positional information of vehicle 200 using the data supplied from a global positioning system (GPS) receiver, a gyroscope, a vehicle speed sensor, and the like, which are not shown in the drawings. The positional information of vehicle 200 includes, for example, the existing position, the traveling direction, and the traveling speed of vehicle 200 incorporating on-board device 220. Note that the existing position may be indicated by latitude and longitude. The traveling direction may be indicated by an azimuth, which takes the north as a reference orientation (0 degrees) and clockwise angles as positive angles. Any known technique may be used to acquire such information, and therefore the detailed description thereof will not be given herein.

Communicator 222 performs road-to-vehicle communication with first communicator 150 of RSU 100. Upon receiving a request signal from first communicator 150, communicator 222 acquires the vehicle information acquired by acquirer 221. Communicator 222 transmits the acquired vehicle information to first communicator 150 of RSU 100.

Configuration of Accident Monitoring Server 300

As illustrated in FIG. 2, accident monitoring server 300 includes communicator 310, memory storage 320, and notifier 330.

Communicator 310 communicates with second communicator 160 of RSU 100. Communicator 310 receives the predetermined-period image information and the vehicle information from second communicator 160 of RSU 100, and outputs the received predetermined-period image information and the received vehicle information to memory storage 320 and notifier 330.

Memory storage 320 retains the predetermined-period image information and the vehicle information that are output from communicator 310 so as to correspond to RSU 100. Memory storage 320 may be configured to include, for example, a semiconductor memory element such as a flash memory, and a recording medium such as a hard disk and an optical disc.

Notifier 330 notifies emergency organizations such as police and fire department of the occurrence of the accident and the accident situation, based on the predetermined-period image information and the vehicle information that are output from communicator 310.

Operations of RSU 100

Figure 3:
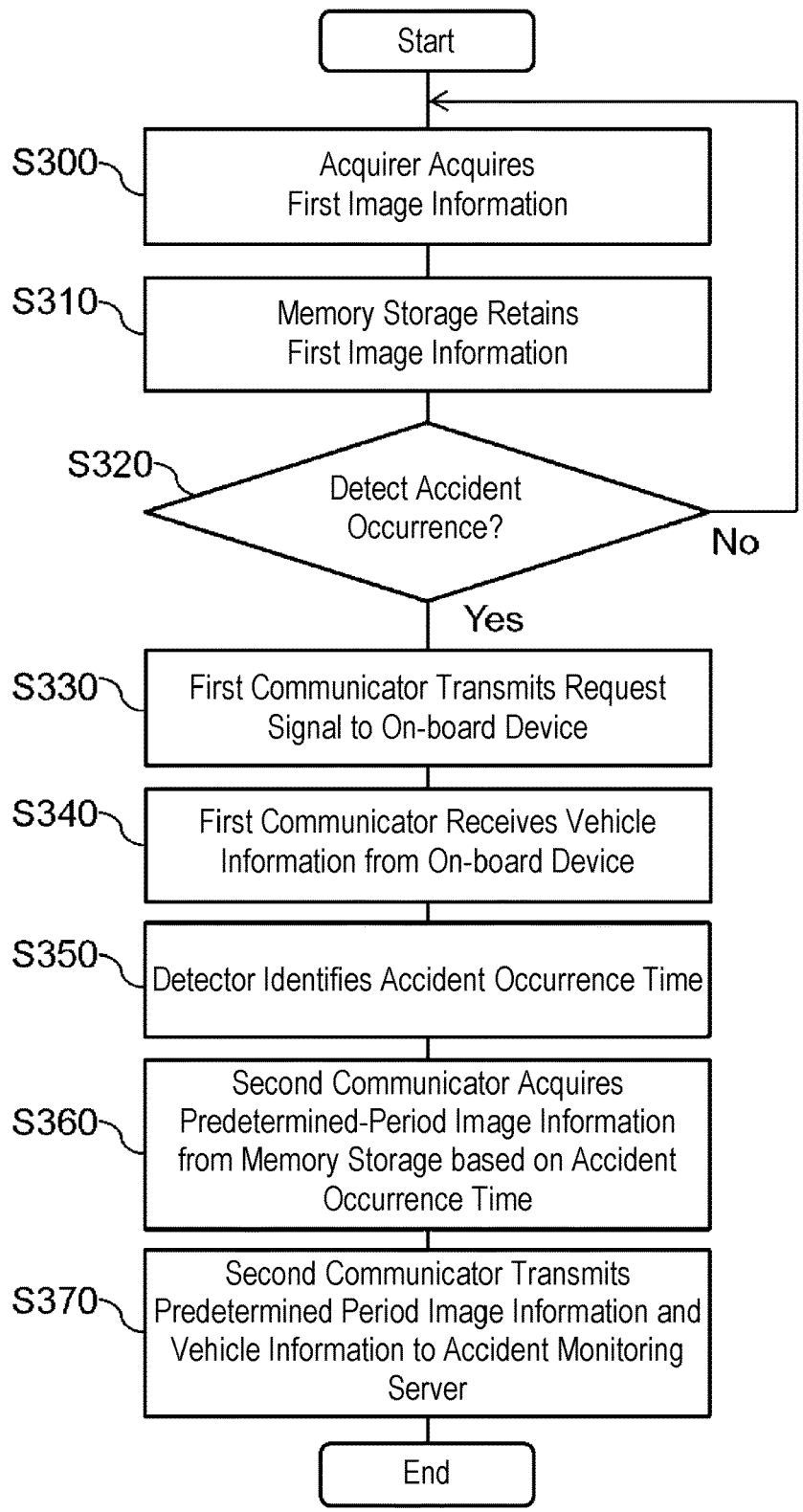
FIG. 3 is a flowchart illustrating operations of the RSU shown in FIG. 2.

Next, operations of RSU 100 will be described. FIG. 3 is a flowchart illustrating the operations of RSU 100.

First, acquirer 120 acquires first image information from imaging device 110 (step S300).

Next, memory storage 140 retains the first image information that is output from acquirer 120 (step S310).

On the other hand, detector 130 detects an occurrence of an accident from an image contained in the first image information that is output from acquirer 120 (step S320). When detector 130 detects the occurrence of the accident ("Yes" in step S320), first communicator 150 broadcast-transmits a request signal to on-board device 220 (step S330). First communicator 150 receives the vehicle information about vehicle 200 from on-board device 220 (step S340).

When detector 130 does not detect an occurrence of an accident ("No" in step S320), RSU 100 repeats the process from step S300 again.

Next, detector 130 identifies an accident occurrence time (step S350).

Subsequently, second communicator 160 acquires the predetermined-period image information from memory storage 140, based on the accident occurrence time identified by detector 130 (step S360).

Next, second communicator 160 transmits the predetermined-period image information and the vehicle information to accident monitoring server 300 (step S370).

Note that in the process of step S370, second communicator 160 may transmit the predetermined-period image information and the vehicle information separately to accident monitoring server 300, other than transmitting the predetermined-period image information and the vehicle information to accident monitoring server 300.

Operations of On-Board Device 220

Figure 4:
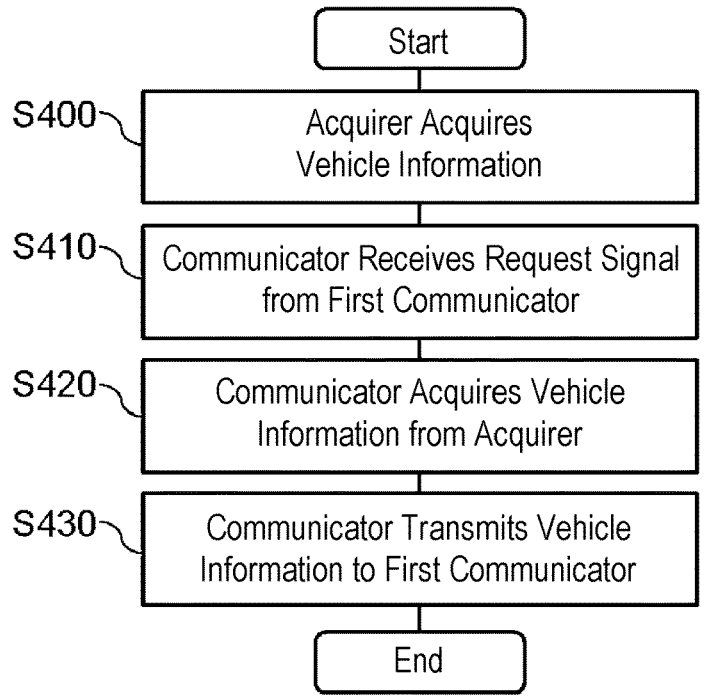
FIG. 4 is a flowchart illustrating operations of an on-board device shown in FIG. 2.

FIG. 4 is a flowchart illustrating operations of on-board device 220.

First, acquirer 221 acquires vehicle information about vehicle 200 (step S400).

Communicator 222 receives a request signal from first communicator 150 of RSU 100 (step S410).

Next, communicator 222 acquires the vehicle information from acquirer 221 (step S420).

Subsequently, communicator 222 transmits the vehicle information to first communicator 150 (step S430).

Operations of Accident Monitoring Server 300

Figure 5:
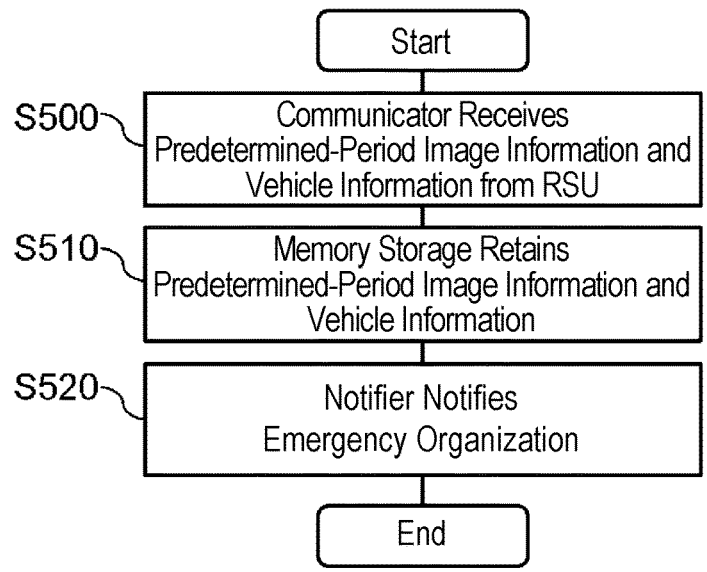
FIG. 5 is a flowchart illustrating operations of an accident monitoring server shown in FIG. 2.

FIG. 5 is a flowchart illustrating operations of accident monitoring server 300.

Communicator 310 receives the predetermined-period image information and the vehicle information from second communicator 160 of RSU 100 (step S500).

Next, memory storage 320 retains the predetermined-period image information and the vehicle information that are output from acquirer 310 (step S510).

Subsequently, notifier 330 notifies emergency organizations such as the police and fire departments of the occurrence of the accident and the accident situation, based on the predetermined-period image information and the vehicle information that are output from communicator 310.

Advantageous Effects

In accident monitoring system 1, RSU 100 serves as a starting point of detecting an occurrence of an accident. This makes it possible to detect the occurrence of the accident even when accident vehicle 410 does not incorporate on-board device 220. Moreover, it is possible to collect information about the accident from vehicles 200 that are traveling in the vicinity of accident vehicle 410 at the time when the accident has occurred. Accordingly, the accident situation can be grasped in detail, and also allows an accurate investigation of the accident. Furthermore, because the occurrence of the accident is detected by RSU 100, reliable report is possible, which may be made use for traffic control or relief activities for injured people after the occurrence of the accident.

In addition, the vehicle information includes the positional information of vehicle 200, and the second image information containing an image taken by imaging device 210 incorporated in vehicle 200. Accordingly, the situation of the accident site can be grasped in detail.

Acquirer 120 acquires the vehicle information from vehicle 200 that is traveling on the road on which the accident has occurred. Specifically, first communicator 150 of RSU 100 performs communication with an output power that is able to make communication only within a short-distance range including road intersection 400. For example, first communicator 150 communicates with communicator 222 that exists within a range in which an image of the accident in road intersection 400 can be taken, such as within a radius of 25 m from the center of road intersection 400.

This enables RSU 100 to limit the vehicle information to be acquired to the vehicle information from vehicles 200 that are traveling in the vicinity of accident vehicle 410. This allows RSU 100 to reduce the processing load when receiving the vehicle information.

RSU 100 includes memory storage 140 that retains the first image information acquired by acquirer 120. Detector 130 identifies an accident occurrence time at which an accident has occurred, and second communicator 160 transmits, to accident monitoring server 300, the first image information and the vehicle information during a predetermined period counted based on the accident occurrence time. This enables RSU 100 to limit the acquired first image information and the acquired vehicle information to the one acquired during the predetermined period of time. This allows RSU 100 to reduce the processing load when transmitting the first image information and the vehicle information to accident monitoring server 300.

It is also possible to acquire the first image information before and after the accident occurrence time. In particular, by acquiring images before the occurrence of the accident, it is possible to ascertain the road condition and the traveling condition of the vehicle at the time of the occurrence of the accident. As a result, it is possible to make use of the first image information for investigating the cause of the accident, ascertaining of traveling conditions, prevention of accidents, and the like. Consequently, it is possible to make use of the first image information for relief activities for injured people, traffic control, and the like.

Moreover, RSU 100 may allow traffic light information at the time of occurrence of the accident to be included in the information to be transmitted to accident monitoring server 300. This makes it possible to determine the condition of the traffic light at the accident occurrence time, which serves to easily determine whether or not each party involved is at fault.

Although an exemplary embodiment of the present disclosure has been described hereinabove, the present disclosure is not limited to the exemplary embodiment described above. For example, it is also possible to employ a roadside unit in which parts of RSU 100 are combined as appropriate. It is also possible to modify the configuration of RSU 100 without departing from the scope of the technical idea of the present disclosure.

In addition, acquirer 120 may receive vehicle information containing an image from on-board device 220 incorporated in vehicle 200 that exists in the vicinity of road intersection 400. In other words, acquirer 120 may acquire image information from imaging device 210. This enables RSU 100 to acquire image information in the range that is unable to obtain by imaging device 110, and to further reduce undetected accident occurrences.

When accident vehicle 410 incorporates on-board device 220, RSU 100 may receive vehicle interior information containing at least one of vehicle interior image and passenger safety information of accident vehicle 410. In this case, second communicator 160 may transmit information including vehicle interior information to accident monitoring server 300. This makes it possible to acquire interior information of accident vehicle 410, and to ascertain the situation in the interior after the occurrence of the accident. For example, by ascertaining the degree of injury of the injured person, whether or not the injured person is unconscious, or the like, the rescue operation for the injured person can be carried out quickly.

First communicator 150 of RSU 100 may also transmit a request signal for requesting vehicle 200 to directly transmit the vehicle information held by vehicle 200 to accident monitoring server 300. This allows RSU 100 to eliminate the need of receiving the vehicle information, eliminating the processing load for receiving the vehicle information. Moreover, because RSU 100 does not need to transmit the vehicle information to accident monitoring server 300, it is possible to reduce the network load between RSU 100 and accident monitoring server 300.

Also, on-board device 220 may have a determination function of determining whether or not an image acquired from imaging device 210 is an accident image, and communicator 222 may acquire the vehicle information from acquirer 221 when the vehicle information is an accident image.

Each of the functional blocks in RSU 100, such as detector 130, first communicator 150, and second communicator 160, may be individually formed into a single chip by a semiconductor device such as LSI, or alternatively, some or all of the functional blocks may be formed into a single chip.

Part or all of the processes of the functional blocks in the exemplary embodiment may be implemented by a computer program. It is also possible that the processes of the foregoing exemplary embodiment may be implemented by hardware, or may be implemented by software (including such cases in which the processes are implemented with an operating system (OS), middleware, or a predetermined library). It is also possible that the processes of the foregoing exemplary embodiment may be implemented by a combined process of software and hardware.

The sequence of executing the processes according to the exemplary embodiment is not necessarily limited to the description of the foregoing exemplary embodiment, but the execution sequence may be changed without departing from the scope of the present disclosure. For example, step S320 shown in FIG. 3 may be performed before step S310 or steps S310 and S320 may be performed at the same time.

The scope of the present disclosure encompasses a processing method executed by RSU 100, a computer program that causes a computer to execute the same processing method, and a computer readable recording medium in which the computer program is recorded. Examples of the computer-readable recording medium include a flexible disk, a hard disk, a CD-ROM, a magneto-optical disc (MO), a DVD, a DVD-ROM, a DVD-RAM, a Blu-ray (registered trademark) disc (BD), and a semiconductor memory. The computer program is not limited to one recorded in the above-described recording medium, and may be transmitted via, for example, electronic telecommunication network, wireless or wired communication network, a network such as exemplified by the Internet, or the like.

As described above, the present disclosure is applicable to a roadside unit used for an accident monitoring system that is able to reliably detect an occurrence of an accident and is able to monitor the accident situation in detail.

What is claimed is:

1. A roadside unit comprising:
    a first communicator configured to perform road-to-vehicle communication with an on-board device incorporated in a first vehicle;
    a second communicator configured to communicate with an accident monitoring server;
    an acquirer configured to acquire first image information from an imaging device that takes images of objects on a road; and
    a detector configured to detect an occurrence of an accident caused by a second vehicle based on the first image information acquired by the acquirer,
    wherein the acquirer acquires vehicle information from the first vehicle via the first communicator when the detector detects the occurrence of the accident; and
    the second communicator transmits, to the accident monitoring server, the first image information and the vehicle information that are acquired by the acquirer.

2. The roadside unit according to claim 1, wherein the vehicle information includes positional information of the first vehicle, and second image information obtained by an imaging device incorporated in the first vehicle.

3. The roadside unit according to claim 1,
    wherein the first vehicle is one of a plurality of first vehicles; and
    the acquirer acquires the vehicle information from one of the plurality of first vehicles that travels on the road on which the accident has occurred.

4. The roadside unit according to claim 1, further comprising:
    a memory storage retaining the first image information acquired by the acquirer,
    wherein the detector identifies an accident occurrence time at which the accident has occurred; and
    the second communicator transmits, to the accident monitoring server, the first image information and the vehicle information during a predetermined period counted based on the accident occurrence time.

5. The roadside unit according to claim 4,
wherein the predetermined period is a constant period of time after the accident occurrence time.

6. The roadside unit according to claim 4,
wherein the predetermined period is a period having an equal time length before and after the accident occurrence time.

7. An accident monitoring system comprising:
an on-board device incorporated in a first vehicle;
an accident monitoring server; and
a roadside unit,
the roadside unit comprising:
a first communicator configured to perform road-to-vehicle communication with the on-board device;
a second communicator configured to communicate with the accident monitoring server;
an acquirer configured to acquire first image information from an imaging device that takes images of objects on a road; and
a detector configured to detect an occurrence of an accident caused by a second vehicle based on the first image information acquired by the acquirer,
wherein the acquirer acquires vehicle information from the first vehicle via the first communicator when the detector detects the occurrence of the accident; and
the second communicator transmits, to the accident monitoring server, the first image information and the vehicle information that are acquired by the acquirer.

\* \* \* \* \*